United States Patent
Smith

(10) Patent No.: US 12,097,850 B2
(45) Date of Patent: Sep. 24, 2024

(54) SYSTEM AND METHOD FOR CONTROLLING THE GROUND SPEED OF AN AGRICULTURAL SPRAYER DURING A TURN

(71) Applicant: CNH Industrial America LLC, New Holland, PA (US)

(72) Inventor: Kevin M. Smith, Narvon, PA (US)

( * ) Notice: Subject to any disclaimer, the term of this patent is extended or adjusted under 35 U.S.C. 154(b) by 408 days.

(21) Appl. No.: 17/342,641

(22) Filed: Jun. 9, 2021

(65) Prior Publication Data
US 2022/0396263 A1     Dec. 15, 2022

(51) Int. Cl.
*B60W 10/04* (2006.01)
*B05B 12/02* (2006.01)
(Continued)

(52) U.S. Cl.
CPC .......... *B60W 30/143* (2013.01); *B05B 12/02* (2013.01); *B60W 10/04* (2013.01); *B60W 10/30* (2013.01);
(Continued)

(58) Field of Classification Search
CPC .... B60W 30/143; B60W 10/04; B60W 10/30; B60W 30/18145; B60W 2300/154; B60W 2520/06; B60W 2556/50; B60W 2720/10; B60W 2720/12; B05B 12/02; B05B 12/006; B05B 12/126; B05B 9/0423; B05B 1/20; B05B 12/04; G05D 1/0219; G05D 1/0223; G05D 2201/0201; A01C 23/007; A01M 7/0089
(Continued)

(56) References Cited

U.S. PATENT DOCUMENTS

| | | | |
|---|---|---|---|
| 4,093,107 A | 6/1978 | Allman et al. | |
| 4,813,604 A | 3/1989 | Curran, Jr. | |
| 7,848,865 B2 | 12/2010 | Di Federico et al. | |
| 10,531,603 B2 | 1/2020 | Ferrari et al. | |

(Continued)

FOREIGN PATENT DOCUMENTS

| | | |
|---|---|---|
| CN | 104686481 A | 6/2015 |
| DE | 102016224781 A1 | 6/2018 |

(Continued)

OTHER PUBLICATIONS

Wolf, "Sprayer Turn Compensation", Sprayers 101, dated Apr. 3, 2018. (3 pages) https://sprayers101.com/turn-compensation/.

*Primary Examiner* — Yonel Beaulieu
*Assistant Examiner* — Jean W Charleston
(74) *Attorney, Agent, or Firm* — Rebecca Henkel; Peter K. Zacharias; Rickard K. DeMille

(57) ABSTRACT

An agricultural sprayer includes a computing system configured to receive a first input associated with a target application rate at which agricultural fluid is to be dispensed onto the field. Moreover, the computing system is configured to receive a second input associated with a turn being made or to be made by the sprayer. Additionally, the computing system is configured to determine a maximum ground speed for the turn at which a selected nozzle dispenses the agricultural fluid onto the field at the target application rate based on the received first and second inputs. Furthermore, when the turn is being made, the computing system is configured to control an operation of the sprayer such that the ground speed of the sprayer is at or below the determined maximum ground speed.

20 Claims, 6 Drawing Sheets

(51) Int. Cl.
 *B60W 10/30* (2006.01)
 *B60W 30/14* (2006.01)
 *B60W 30/18* (2012.01)
 *G05D 1/00* (2006.01)
 *A01C 23/00* (2006.01)
 *A01M 7/00* (2006.01)

(52) U.S. Cl.
 CPC ..... *B60W 30/18145* (2013.01); *G05D 1/0219* (2013.01); *G05D 1/0223* (2013.01); *A01C 23/007* (2013.01); *A01M 7/0089* (2013.01); *B60W 2300/154* (2013.01); *B60W 2520/06* (2013.01); *B60W 2556/50* (2020.02); *B60W 2720/10* (2013.01); *B60W 2720/12* (2013.01)

(58) Field of Classification Search
 USPC .......................................................... 701/36
 See application file for complete search history.

(56) References Cited

U.S. PATENT DOCUMENTS

| | | | |
|---|---|---|---|
| 10,721,856 B2 | 7/2020 | Miwa | |
| 10,842,068 B2 | 11/2020 | Czapka et al. | |
| 2013/0161413 A1* | 6/2013 | Funseth | B05B 1/3026 |
| | | | 239/164 |
| 2017/0006852 A1* | 1/2017 | Engelbrecht | A01M 7/0089 |
| 2018/0243771 A1* | 8/2018 | Davis | A01M 7/0082 |
| 2018/0243774 A1* | 8/2018 | Davis | B05B 9/06 |
| 2019/0351434 A1* | 11/2019 | Smith | B05B 12/124 |
| 2020/0156100 A1* | 5/2020 | Booher | B05B 12/04 |
| 2021/0172444 A1* | 6/2021 | Ruppert | A01C 15/04 |
| 2022/0167543 A1* | 6/2022 | Bast | G05D 1/0223 |

FOREIGN PATENT DOCUMENTS

| | | |
|---|---|---|
| JP | 2012196157 A | 10/2012 |
| WO | WO2020245025 | 12/2020 |

\* cited by examiner

SYSTEM AND METHOD FOR CONTROLLING THE GROUND SPEED OF AN AGRICULTURAL SPRAYER DURING A TURN

FIELD OF THE INVENTION

The present disclosure generally relates to agricultural sprayers and, more particularly, to systems and methods for controlling the ground speed of an agricultural sprayer during a turn.

BACKGROUND OF THE INVENTION

Agricultural sprayers apply an agricultural fluid (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes a boom assembly on which a plurality of spaced apart nozzles is mounted. Each nozzle is configured to dispense or otherwise spray a fan of the agricultural fluid onto underlying crops and/or field surface.

In general, it desirable to apply agricultural fluids to the field at a target application rate to facilitate the desired agricultural outcome (e.g., a reduction in weed coverage or pest activity). However, when an agricultural sprayer is turning, the nozzles positioned near the outside of the turn travel faster relative to the underlying crops and/or field surface than the nozzles positioned near inside of the turn. In such instances, the nozzles positioned near the outside of the turn may underapply the agricultural fluid on the underlying crops and/or field surface.

Accordingly, an improved system and method for controlling the ground speed of an agricultural sprayer would be welcomed in the technology. In particular, a system and method for controlling the ground speed of an agricultural sprayer that improves spray quality during turns would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. The agricultural sprayer includes a frame and a tank supported on the frame, with the tank configured to store an agricultural fluid. Furthermore, the agricultural sprayer includes a boom assembly coupled to the frame and a plurality of nozzles supported on the boom assembly, with the plurality of nozzles configured to dispense the agricultural fluid stored within the tank onto an underlying field. Additionally, the agricultural sprayer includes a computing system configured to receive a first input associated with a target application rate at which the agricultural fluid is to be dispensed onto the field. Moreover, the computing system is configured to receive a second input associated with a turn being made or to be made by the agricultural sprayer. In addition, the computing system is configured to determine a maximum ground speed for the turn at which a selected nozzle of the plurality of nozzles dispenses the agricultural fluid onto the field at the target application rate based on the received first and second inputs. Furthermore, the computing system is configured to control an operation of the agricultural sprayer such that the ground speed of the agricultural sprayer is at or below the determined maximum ground speed when the turn is being made.

In another aspect, the present subject matter is directed to a system for controlling a ground speed of an agricultural sprayer. The system includes a boom assembly and a nozzle supported on the boom assembly, with the nozzle configured to dispense an agricultural fluid onto a field across which the agricultural sprayer is traveling. Additionally, the system includes a computing system configured to receive a first input associated with a target application rate at which the agricultural fluid is to be dispensed onto the field. Moreover, the computing system is configured to receive a second input associated with a turn being made or to be made by the agricultural sprayer. In addition, the computing system is configured to determine a maximum ground speed for the turn at which the nozzle dispenses the agricultural fluid onto the field at the target application rate based on the received first and second inputs. Furthermore, the computing system is configured to control an operation of the agricultural sprayer such that the ground speed of the agricultural sprayer is at or below the determined maximum ground speed when the turn is being made.

In a further aspect, the present subject matter is directed to a method for controlling a ground speed of an agricultural sprayer. The agricultural sprayer, in turn, includes a nozzle configured to dispense an agricultural fluid onto a field across which the agricultural sprayer is traveling, the method comprising. The method includes receiving, with a computing system, a first input associated with a target application rate at which the agricultural fluid is to be dispensed onto the field. Additionally, the method includes receiving, with the computing system, a second input associated with a turn being made or to be made by the agricultural sprayer. Moreover, the method includes determining, with the computing system, a maximum ground speed for the turn at which the nozzle dispenses the agricultural fluid onto the field at the target application rate based on the received first and second inputs. In addition, the method includes controlling, with the computing system, an operation of the agricultural sprayer such that the ground speed of the agricultural sprayer is at or below the determined maximum ground speed when the turn is being made.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
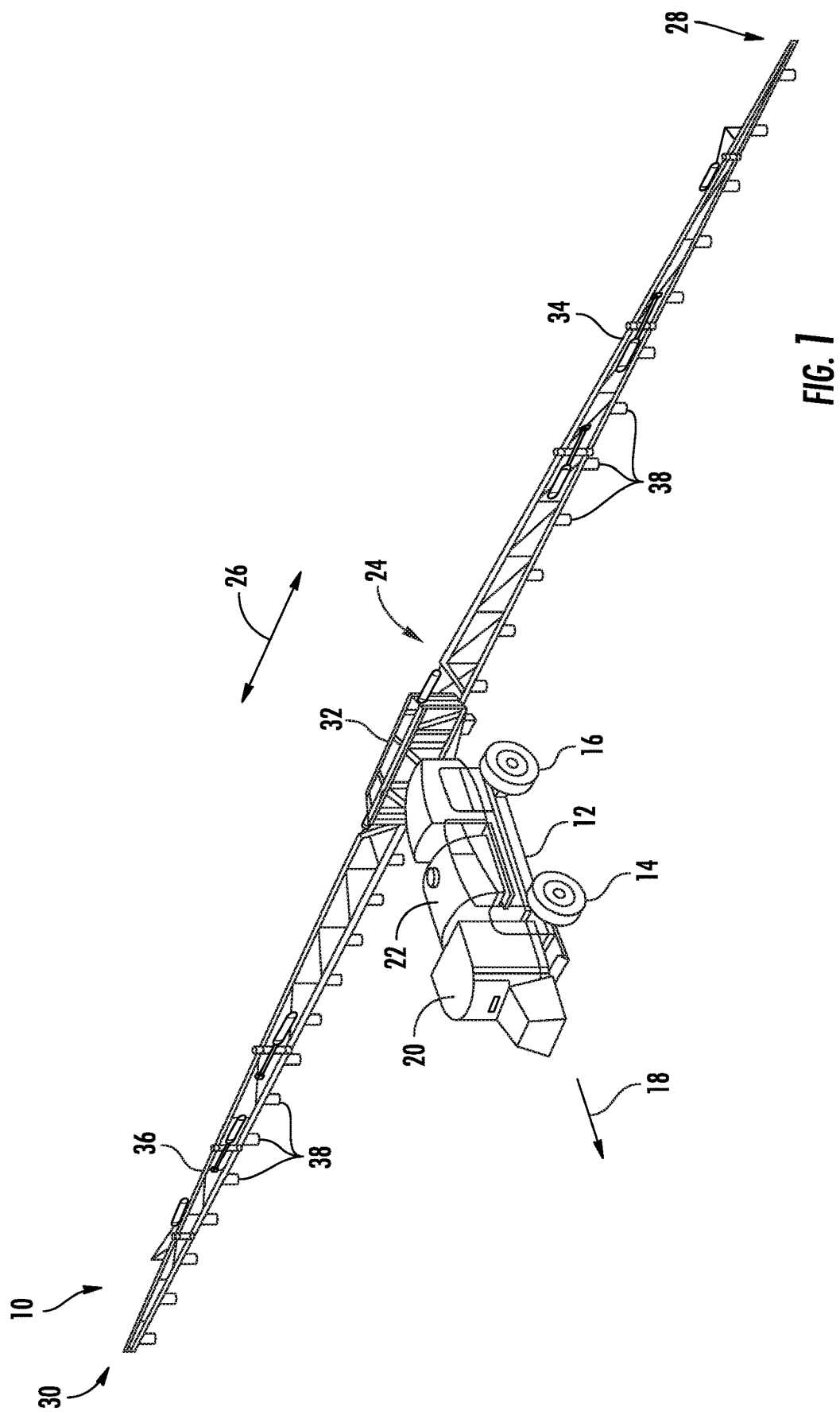
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the ground speed of an agricultural sprayer. As will be described below, the agricultural sprayer may include a boom assembly and one or more nozzles supported on the boom assembly. In this respect, as the agricultural sprayer travels across a field to perform a spraying operation thereon, the nozzle(s) may be configured to spray or otherwise dispense an agricultural fluid (e.g., a pesticide, a nutrient, and/or the like) onto the underlying field.

In several embodiments, a computing system may be configured to control the ground speed of the agricultural sprayer when making turns such that the nozzle(s) dispense the agricultural fluid at a target application rate. Specifically, in such embodiments, the computing system may receive a first input associated with the target application rate at which the agricultural fluid is to be dispensed onto the field (e.g., from the operator via a user interface). Furthermore, the computing system may receive a second input associated with a turn being made or to be made by the agricultural sprayer. For example, in some embodiments, the computing system may receive the second input from a steering angle sensor of the sprayer or a location sensor and a stored guidance map. Additionally, the computing system may determine a maximum ground speed for the turn based on the received first and second inputs. This determined maximum ground is, in turn, the maximum ground speed at which a selected nozzle on the boom assembly (e.g., the outermost nozzle relative to the direction of the turn) can dispense the agricultural fluid onto the field at the target application rate (e.g., when operating at a one hundred percent duty cycle). In some embodiments, other inputs (e.g., nozzle flow parameter(s), nozzle position, etc.) may be used in addition to the received first and second inputs to determine the maximum ground speed. Thereafter, the computing system may control the operation of the sprayer such that the ground speed of the agricultural sprayer is at or below the determined maximum ground speed when the turn is being made.

Controlling the ground speed of the agricultural sprayer when turning to maintain the target application rate of the agricultural fluid improves the operation of the sprayer and the effectiveness of the associated spraying operation. More specifically, when a sprayer makes a turn, the nozzles positioned on the outside of the turn move faster relative to the underlying field than the nozzles positioned on the inside of the turn. For example, when the sprayer turns right, the nozzles on the left side of the boom assembly move faster relative to the field than the nozzles of the right side of the boom assembly. As such, in certain instances, when the sprayer is making a turn, one or more nozzles on the outside of the turn may be unable to dispense the agricultural fluid at the target application rate, even when operating at a one hundred percent duty cycle. In such instances, the agricultural fluid may be underapplied to the portion(s) of the field underlying such nozzle(s), thereby resulting in poor agricultural performance. However, as described above, the disclosed system and method determine the maximum ground speed at which the sprayer can travel around the turn such that all of the nozzles meet the target application rate and subsequently controls the ground speed of the sprayer during the turn based on this maximum speed. In this respect, the disclosed system and method ensure that, during a spraying operation, agricultural fluid is applied to all portions of the field at that target application rate, including the portions of the field traversed by nozzles positioned on the outside of turns. This, in turn, improves the effectiveness of the spraying operation and agricultural performance of the field.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and an agricultural fluid tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction (indicated by arrow 26) between a first lateral end 28 and a second lateral end 30, with the lateral direction 26 being perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. Furthermore, a plurality of nozzles 38 (also referred to as spray tips) may be supported on the boom assembly 24. Each nozzle 38 may, in turn, be configured to dispense the agricultural fluid stored in the tank 22 onto the underlying field. However, in alternative embodiments, the boom assembly 24 may have any other suitable configuration.

Figure 2:
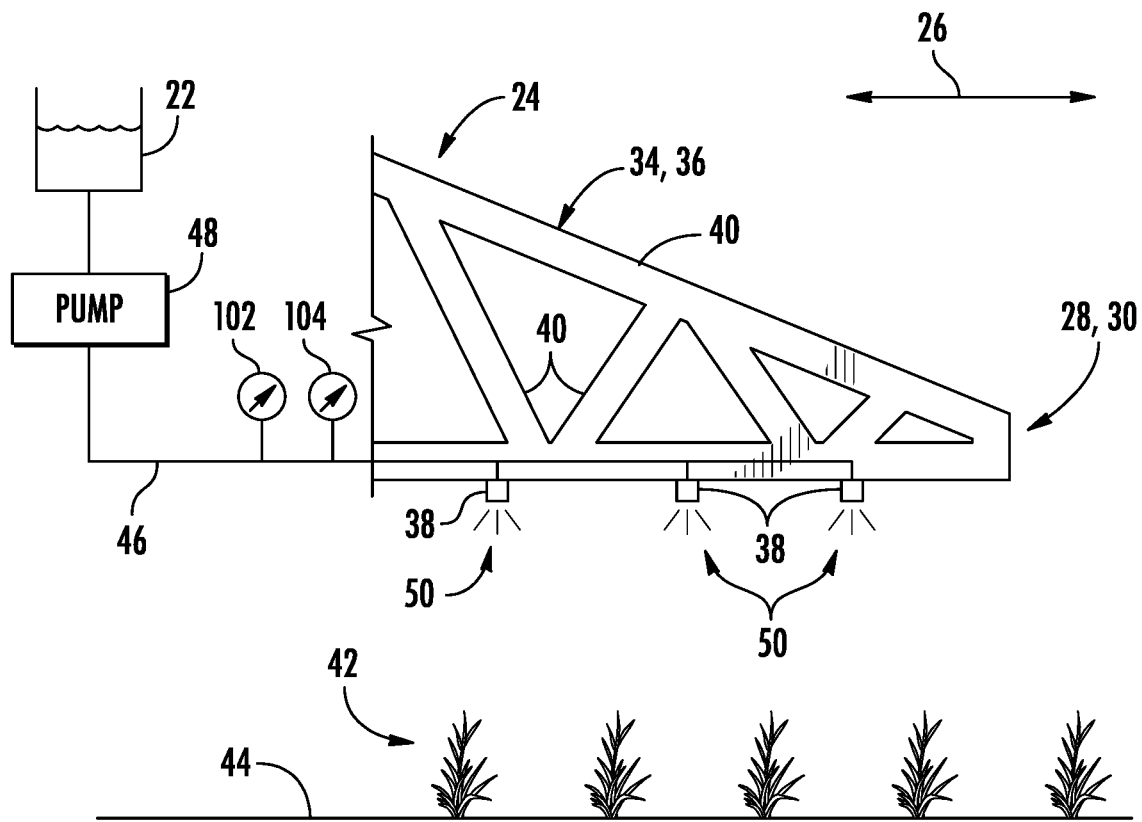
FIG. 2 illustrates a partial front view of one embodiment of a boom assembly of an agricultural sprayer in accordance with aspects of the present subject matter.

FIG. 2 illustrates a partial front view of one embodiment of a boom assembly 24 of the sprayer 10. In general, the boom assembly 24 may include a plurality of structural frame members 40, such as beams, bars, and/or the like. Moreover, as mentioned above, the boom assembly 24 may support a plurality of spray nozzles 38. Each nozzle 38 may, in turn, be configured to dispense the agricultural fluid stored within the tank 22 onto underlying crops 42 or an underlying field surface 44. Specifically, as shown, the nozzles 38 are mounted on and/or coupled to the frame members 40 such that the nozzles 38 are spaced apart from each other in the lateral direction 26. Furthermore, a fluid conduit(s) 46 may fluidly couple the nozzles 38 to the tank 22. Moreover, a pump 48 may be configured to receive agricultural fluid from the tank 22 and supply a pressurized flow of the agricultural fluid to the nozzles 38.

As the sprayer 10 travels across the field to perform a spraying operation thereon, each nozzle 38 may dispense or otherwise spray a fan 50 of the agricultural fluid. The dispensed agricultural fluid may be deposited onto the underlying crops 42 or field surface 44 at a target application rate. The target application rate may, in turn, be the amount or volume of agricultural fluid to be deposited onto a unit of area of the crops/field surface to necessary achieve a desired agricultural outcome (e.g., weed reduction). For example, a herbicide may be applied to the field at a target application rate to kill weeds growing in the field. However, when underapplied, the herbicide may be unable to kill the weeds growing in the field. In fact, in certain instances, underapplying herbicide may strengthen the weeds. In this respect, as will be described below, the duty cycle of the nozzles 38 and the ground speed of the sprayer 10 may controlled to ensure the target application rate is met.

It should be further appreciated that the configuration of the agricultural sprayer 10 described above and shown in FIGS. 1 and 2 is provided only to place the present subject matter in an exemplary field of use. Thus, it should be appreciated that the present subject matter may be readily adaptable to any manner of agricultural sprayer configuration.

As shown in FIG. 2, the agricultural sprayer 10 may include one or more pressure sensors 102. In general, the pressure sensor(s) 102 may be configured to capture data indicative of the pressure of the agricultural fluid being supplied to the nozzles 38. As such, the pressure sensor(s) 102 may be in fluid communication with one of the fluid conduit(s) 46. For example, the pressure sensor(s) 102 may correspond to a diaphragm pressure sensor(s), a piston pressure sensor(s), a strain gauge-based pressure sensor(s), an electromagnetic pressure sensor(s), and/or the like.

Additionally, the agricultural sprayer 10 may include one or more flow rate sensors 104. In general, the flow rate sensor(s) 104 may be configured to capture data indicative of the flow rate of the agricultural fluid being supplied to the nozzles 38. As such, the flow rate sensor(s) 104 may be in fluid communication with one of the fluid conduit(s) 46. For example, the flow rate sensor(s) 104 may correspond to a gear flow meter(s), a piston flow meter(s), a venturi flow meter(s), and/or the like.

Figure 3:
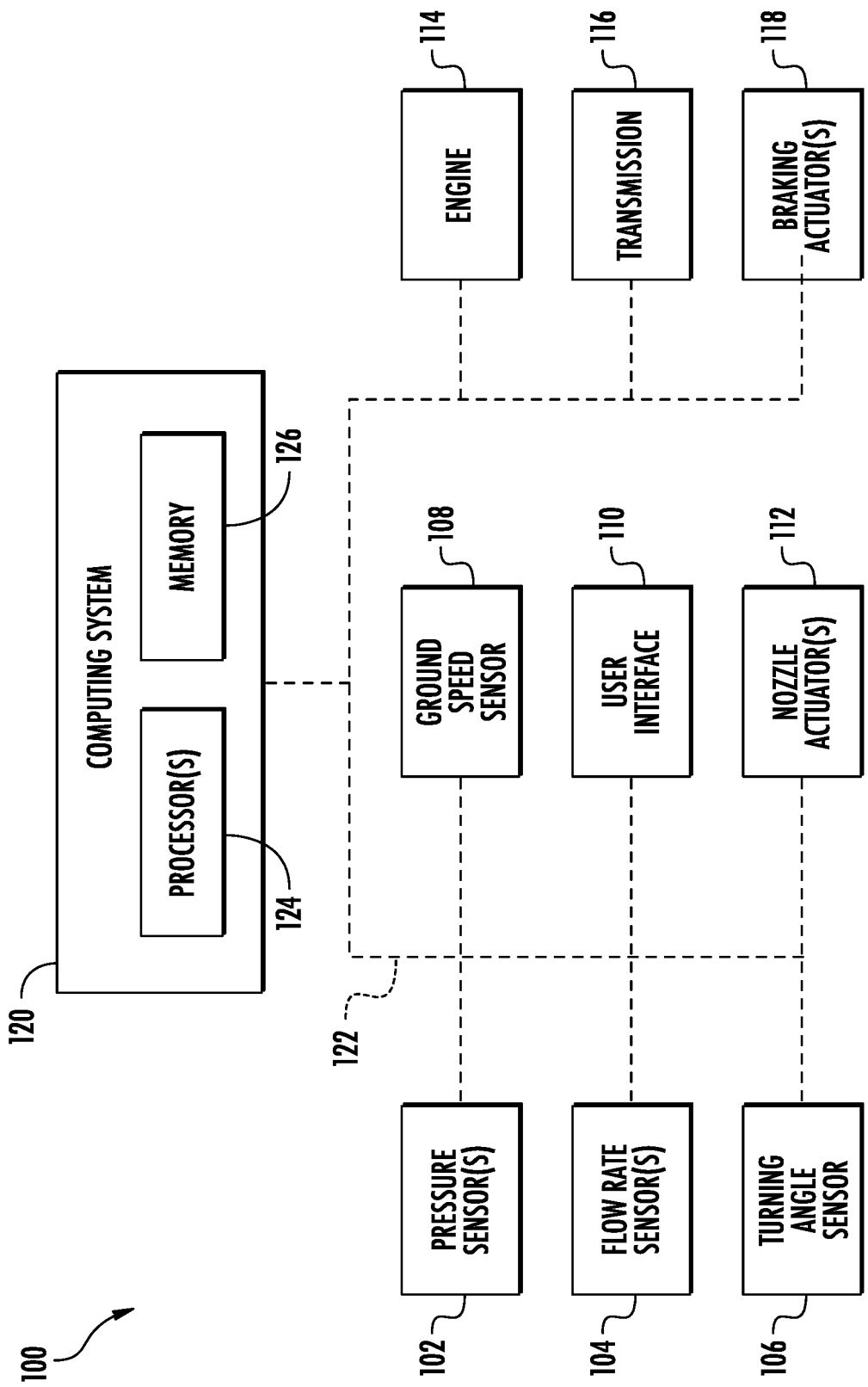
FIG. 3 illustrates a schematic view of one embodiment of a system for controlling the ground speed of an agricultural sprayer in accordance with aspects of the present subject matter.

Referring now to FIG. 3, a schematic view of one embodiment of a system 100 for controlling a ground speed of an agricultural sprayer is illustrated in accordance with aspects of the present subject matter. In general, the system 100 will be described herein with reference to the agricultural sprayer 10 described above with reference to FIGS. 1 and 2. However, it should be appreciated by those of ordinary skill in the art that the disclosed system 100 may generally be utilized with agricultural sprayers having any other suitable sprayer configuration.

As shown in FIG. 2, the system 100 includes various sensors that capture data indicative of the operation of the sprayer 10, such as the pressure and flow rate sensors 102, 104. Additionally, in several embodiments, the system 100 may include a turning angle sensor 106. In general, the turning angle sensor 106 may be configured to capture data indicative of the turning radius or turning angle of the sprayer 10. For example, in some embodiments, the turning angle sensor 106 may correspond to a steering angle sensor (e.g., a Hall Effect sensor) provided in operative association with a steering actuator or assembly (not shown) of the sprayer 10. In such embodiments, the turning angle sensor 106 may be configured to capture data indicative of the current turning angle/radius of the sprayer 10. Alternatively, in other embodiments, the turning angle sensor 106 may correspond to a location/positioning sensor, such as a GPS receiver. In such embodiments, the turning angle sensor 106 may be used in combination with a stored guidance map to determine the turning angle/radius of a turn to be made later. However, the turning angle sensor 106 may correspond to any other suitable sensing device configured to capture data indicative of the angle and/or radius of a turn being made or to be made by the sprayer 10.

Moreover, in several embodiments, the system 100 may include a ground speed sensor 108. In general, the ground speed sensor 108 may be configured to capture data indicative of the ground speed at which the sprayer 10 is traveling across the field. For example, the ground speed sensor 108 may correspond to a Hall Effect sensor provided in operative associated with one of the wheels 14, 16 or a transmission output shaft (not shown), a location/positioning sensor (e.g., a GPS receiver), and/or the like. In one embodiment, the system 100 may include a GPS receiver or other location/positioning sensor that corresponds to both the turning angle sensor 106 and the ground speed sensor 108. Alternatively, the turning angle sensor 106 and the ground speed sensor 108 may be separate sensors/sensing devices.

In addition, the system 100 may also include a user interface 110. More specifically, the user interface 110 may be configured to receive inputs (e.g., inputs associated with the target application rate of the agricultural fluid for the field) from the operator. As such, the user interface 110 may include one or more input devices, such as touchscreens, keypads, touchpads, knobs, buttons, sliders, switches, mice, microphones, and/or the like, which are configured to receive user inputs from the operator. Moreover, some embodiments of the user interface 110 may include one or more feedback devices (not shown), such as display screens, speakers, warning lights, and/or the like, which are configured to provide feedback to the operator. In one embodiment, the user interface 110 may be mounted or otherwise positioned within the cab 20 of the sprayer 10. However, in alternative embodiments, the user interface 110 may mounted at any other suitable location.

Furthermore, the system 100 may include one or more nozzle actuators 112, with each nozzle actuator 112 corresponding to one of the nozzles 38 of the sprayer 10. In general, each nozzle actuator 112 may be configured to control the amount of agricultural fluid dispensed by the corresponding nozzle 38. For example, in several embodiments, each nozzle actuator 112 may be configured to open and close a valve member (not shown) positioned within the corresponding nozzle according to a duty cycle, thereby controlling the amount of agricultural fluid dispensed by the nozzle 38. As such, in some embodiments, the nozzle actuator(s) 112 may be configured as a solenoid(s). However, in alternative embodiments, the nozzle actuator(s) 112 may be configured as any other suitable device(s) configured to control the amount of agricultural fluid dispensed by the corresponding nozzle 38.

Additionally, the system 100 may include one or more devices of the sprayer 10 (or a work vehicle towing the sprayer 10) that are configured to adjust the ground speed at which the sprayer 10 is traveling across the field. For example, the system 100 may include an engine 114 and a transmission 116 of the sprayer 10 (or a work vehicle towing the sprayer 10). In general, the engine 114 may be configured to generate power by combusting or otherwise burning a mixture of air and fuel. The transmission 116 may, in turn, be operably coupled to the engine 114 and may provide variably adjusted gear ratios for transferring the power generated by the engine to the driven wheels 16. For example, increasing the power output by the engine 114 (e.g., by increasing the fuel flow to the engine 114) and/or shifting the transmission 116 into a higher gear may increase the ground speed at which the sprayer 10 moves across the field. Conversely, decreasing the power output by the engine 114 (e.g., by decreasing the fuel flow to the engine 114) and/or shifting the transmission 116 into a lower gear may decrease the ground speed at which the sprayer 10 moves across the field.

Moreover, the system 100 may include one or more braking actuators 118 of the sprayer 10 (or a work vehicle towing the sprayer 10). In general, when activated, the braking actuator(s) 118 may reduce the speed at which the sprayer 10 moves across the field, such as by converting energy associated with the movement of the sprayer 10 into heat. For example, in one embodiment, the braking actuator(s) 118 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 118 may any other suitable hydraulic, pneumatic, mechanical, and/or electrical component(s) configured to convert the rotation of the rotating element(s) into heat.

In addition, the system 100 may include a computing system 120 communicatively coupled to one or more components of the sprayer 10 and/or the system 100 to allow the operation of such components to be electronically or automatically controlled by the computing system 120. For instance, the computing system 120 may be communicatively coupled to the various sensors 102, 104, 106, 108 of the system 100 via a communicative link 122. As such, the computing system 120 may be configured to receive data from the sensors 102, 104, 106, 108 that is indicative of one or more parameters associated with the operation of the sprayer 10. Furthermore, the computing system 120 may be communicatively coupled to the user interface 110 via the communicative link 122. In this respect, the computing system 120 may be configured to receive operator inputs from the user interface 110 that are indicative of the target application rate for the agricultural fluid across the field. Additionally, the computing system 120 may be communicatively coupled to the nozzle actuator(s) 112 via the communicative link 122. As such, the computing system 120 may be configured to control the operation of the nozzle actuator(s) 112 to control the amount of agricultural fluid dispensed by the nozzle(s) 38. Moreover, the computing system 120 may be communicatively coupled to the engine 114, the transmission 116, and/or the braking actuator(s) 118 of the sprayer 10 via the communicative link 122. In this respect, the computing system 120 may be configured to control the operation of such devices 114, 116, 118 to adjust the ground speed at which the sprayer 10 is traveling across the field. In addition, the computing system 120 may be communicatively coupled to any other suitable components of the sprayer 10 and/or the system 100.

In general, the computing system 120 may comprise one or more processor-based devices, such as a given controller or computing device or any suitable combination of controllers or computing devices. Thus, in several embodiments, the computing system 120 may include one or more processor(s) 124 and associated memory device(s) 126 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 126 of the computing system 120 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 126 may generally be configured to store suitable computer-readable instructions that, when implemented by the processor(s) 124, configure the computing system 120 to perform various computer-implemented functions, such as one or more aspects of the methods and algorithms that will be described herein. In addition, the computing system 120 may also include various other suitable components, such as a communications circuit or module, one or more input/output channels, a data/control bus and/or the like.

The various functions of the computing system 120 may be performed by a single processor-based device or may be distributed across any number of processor-based devices, in which instance such devices may be considered to form part of the computing system 120. For instance, the functions of the computing system 120 may be distributed across multiple application-specific controllers or computing devices, such as a navigation controller, an engine controller, a transmission controller, a braking system controller, a spray controller, and/or the like.

Figure 4:
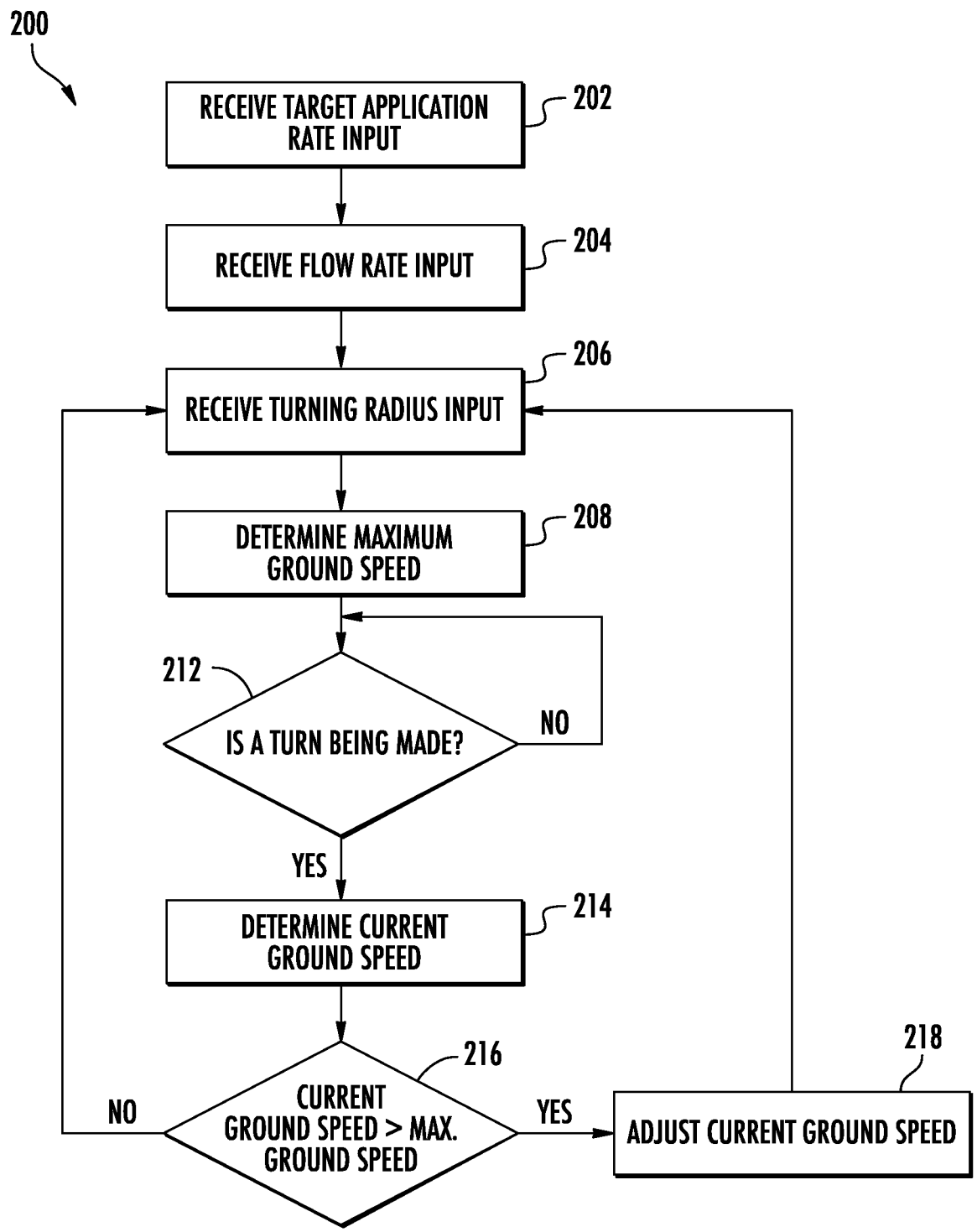
FIG. 4 illustrates a flow diagram providing one embodiment of example control logic for controlling the ground speed of an agricultural sprayer in accordance with aspects of the present subject matter.

Referring now to FIG. 4, a flow diagram of one embodiment of example control logic 200 that may be executed by the computing system 120 (or any other suitable computing system) for controlling a ground speed of an agricultural sprayer is illustrated in accordance with aspects of the present subject matter. Specifically, the control logic 200 shown in FIG. 4 is representative of steps of one embodiment of an algorithm that can be executed to adjust the ground speed of an agricultural sprayer in a manner that improves spray quality during turns while maximizing the ground speed of the sprayer. Thus, in several embodiments, the control logic 200 may be advantageously utilized in association with a system installed on or forming part of an agricultural sprayer to allow for real-time ground speed control without requiring substantial computing resources and/or processing time. However, in other embodiments, the control logic 200 may be used in association with any other suitable system, application, and/or the like for controlling the ground speed of a sprayer.

As shown in FIG. 4, at (202), the control logic 200 includes receiving an input associated with a target application rate at which agricultural fluid is to be dispensed onto field by a nozzle of an agricultural sprayer. Specifically, as mentioned above, in several embodiments, the computing system 120 may be communicatively coupled to the user interface 110 via the communicative link 122. In this respect, before beginning a spraying operation, the operator of the sprayer 10 may input a target agricultural fluid application rate for the field into the user interface 110. Thereafter, the operator input may be transmitted from the user interface 110 to the computing system 120 via the communicative link 122. As will be described below, the ground speed of the agricultural sprayer 10 and the duty cycles of the nozzles 38 may be controlled during turns to ensure that all of the nozzles 38 are depositing agricultural fluid onto the field at the target application rate.

Furthermore, at (204), the control logic 200 includes receiving an input associated with the flow rate of the agricultural fluid through the nozzle of the agricultural sprayer. Specifically, as mentioned above, in several embodiments, the computing system 120 may be communicatively coupled to the pressure and flow rate sensors 102, 104 via the communicative link 122. In this respect, as the sprayer 10 travels across the field to perform the spraying operation, the computing system 120 may receive sensor data indicative of the pressure and/or flow rate of the agricultural fluid being supplied to the nozzles 38. Thereafter, the computing system 120 may determine the pressure and/or flow rate of the agricultural fluid based on the received sensor data. For example, the computing system 120 may include a look-up table(s), suitable mathematical formula, and/or algorithms stored within its memory device(s) 126 that correlate the received sensor data to the pressure and/or flow rate of the agricultural fluid. Additionally, in some embodiments, the computing system 120 may receive one or more additional inputs associated with the flow rate of the agricultural fluid through the nozzles 38 from the operator via the user interface 110, such as the orifice size of the nozzles 38. However, in alternative embodiments, the computing system 120 may receive any other inputs associated with the flow rate of the agricultural fluid through the nozzles 38.

Additionally, at (206), the control logic 200 includes receiving an input associated with a turn being made or to be made by the agricultural sprayer. Specifically, as mentioned above, in several embodiments, the computing system 120 may be communicatively coupled to the turning angle sensor 106 via the communicative link 122. In this respect, as the sprayer 10 travels across the field to perform the spraying operation, the computing system 120 may receive sensor data associated with a turn being made or to be made by the sprayer 10. For example, as mentioned above, in some embodiments, the turning angle sensor 106 may correspond to a steering angle sensor. In such embodiments, the computing system 120 may receive data from the turning angle sensor 106 via the communicative link 122, with such data being indicative of the current turning angle or radius of sprayer 10. As such, the computing system 120 may include a look-up table(s), suitable mathematical formula, and/or algorithms stored within its memory device(s) 126 that correlates the received steering angle sensor data to the current turning radius/angle of the sprayer 10. Alternatively, as mentioned above, the turning angle sensor 106 may correspond to a location sensor, such as GPS receiver. In such embodiments, the computing system 120 may receive location data (e.g., coordinates) from the turning angle sensor 106 via the communicative link 122 that, in combination with a stored guidance map (e.g., stored within the memory device(s) 126), can be used to determine the angle or radius of an upcoming turn to be made by the sprayer 10. However, in alternative embodiments, the computing system 120 may receive any other suitable input(s) associated with a turn being made or to be made by the agricultural sprayer 10.

As shown in FIG. 4, at (208), the control logic 200 includes determining a maximum ground speed for the turn at which the nozzle of the sprayer dispenses the agricultural fluid onto the field at the target application rate. In several embodiments, the computing system 120 may determine the maximum ground speed for the turn based on the received inputs (e.g., the inputs received at (202), (204), and (206)). Specifically, in one embodiment, the computing system 120 may determine the maximum ground speed for the turn based on the target application rate for the field (e.g., as received at (202)); one or more nozzle flow rate parameter (s), such as the pressure and/or flow rate of the agricultural fluid being supplied to the nozzles 38 and/or the orifice sizes of the nozzles 38 (e.g., as received at (204)); the angle or radius of the turn being made or to be made (e.g., as determined at (206)); and the position of the nozzles 38 on the boom assembly 24. As will be described below, the operation of the sprayer 10 may be controlled during the turn such that its ground speed does not exceed the determined maximum ground speed. This, in turn, ensures that the agricultural fluid is applied to all portions of the field at the target application rate during the spraying operation.

Figure 5:
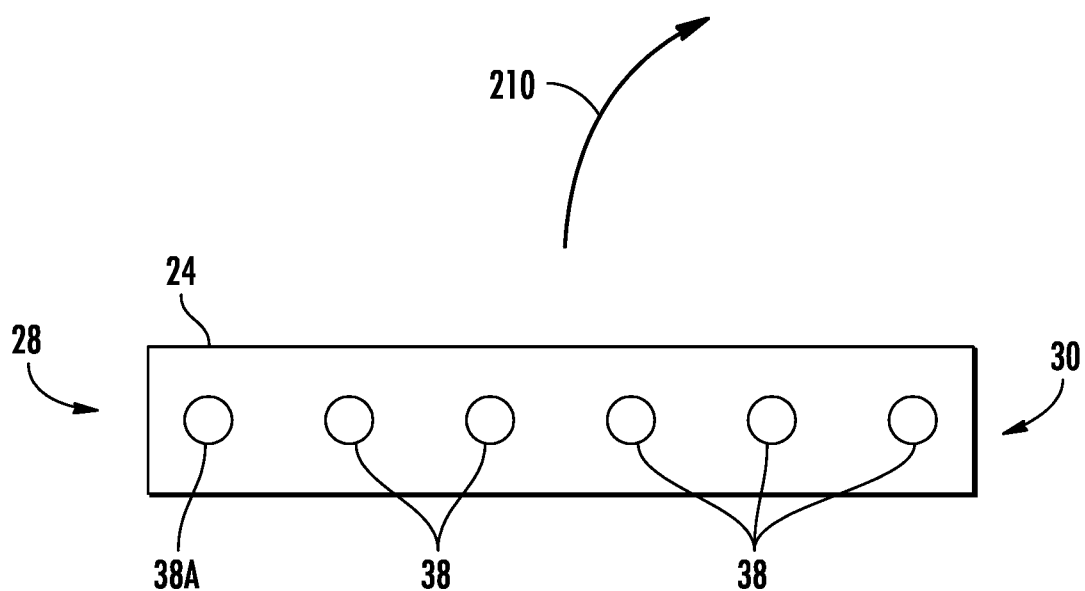
FIG. 5 is a diagrammatic top view of a boom assembly of an agricultural sprayer in accordance with aspects of the present subject matter, particularly illustrating the positioning of various nozzles of the sprayer during a turn.

At (208), the computing system 120 may be configured to determine the maximum ground speed for the turn at which a selected nozzle of the plurality of nozzles 38 supported on the boom assembly 24 dispenses the agricultural fluid onto the field at the target application rate. In several embodiments, the selected nozzle is the nozzle 38 positioned nearest to the end 28, 30 of the boom assembly 24 located on the outside of the turn. More specifically, when the sprayer makes a turn, the nozzles 38 positioned on the outside of the turn move faster relative to the underlying crops/field surface than the nozzles 38 positioned on the inside of the turn. For example, FIG. 5 illustrates the boom assembly 24 when the sprayer 10 is making a right turn (e.g., as indicated by arrow 210). As shown, in such an instance, the first lateral end 28 of the boom assembly 24 is positioned on the outside the turn 210, while the second lateral end 30 is positioned on the inside of the turn 210. In this respect, a nozzle 38A, which is positioned nearest to the first lateral end 28, moves the faster relative to the underlying crops/field surface than all of the other nozzles 38 when the sprayer makes the turn 210. Thus, determining the maximum ground speed for the turn 210 at which the nozzle 38A dispenses the agricultural fluid onto the field at the target application rate may generally ensure that agricultural fluid is deposited at the target application rate over the entire swath of the field being traversed by the sprayer 10 during the turn 210.

In addition, the computing system 120 may determine the maximum ground speed at (208) before making the turn or while the turn is being made. More specifically, as mentioned above, in some embodiments, the turning angle sensor 106 may correspond to a steering angle sensor such that the computing system 120 receives data indicative of the angle or radius of a turn as the turn is being made. In such embodiments, the computing system 120 may determine the maximum ground speed while the turn is being made because the data needed to make such determination is not available until the turn is being made. Conversely, in other embodiments, the turning angle sensor 106 may correspond to a location sensor such that the computing system 120 can determine the radius or angle of an upcoming turn based on the received location data (e.g., coordinates) and a stored guidance map. In such embodiments, the computing system 120 may determine the maximum ground speed before the turn is being made because the data needed to make such determination is available before the turn is made.

Referring again to FIG. 4, the operation of the agricultural sprayer may be controlled such that the ground speed of the sprayer is at or below the determined maximum ground speed when the turn is being made. More specifically, at (212), the control logic 200 includes determining whether a turn is currently being made. For example, in several embodiments, the computing system 120 may determine when a turn is being made based on the input received at (206) (e.g., the sensor data received from the turning angle sensor 106). When it is determined that a turn is not being made at (212), the computing system 120 may pause for a predetermined time period (e.g., 0.5 seconds) before repeating (212).

Conversely, when it is determined that a turn is being made at (212), the control logic 200 includes, at (214), determining the current ground speed of the agricultural sprayer. Specifically, as mentioned above, in several embodiments, the computing system 120 may be communicatively coupled to the ground speed sensor 108 via the communicative link 122. In this respect, as the sprayer 10 travels across the field to perform the spraying operation, the computing system 120 may receive sensor data indicative of the current ground speed of the agricultural sprayer 10. Thereafter, the computing system 120 may determine the current ground speed of the agricultural sprayer 10 based on the received sensor data. For example, the computing system 120 may include a look-up table(s), suitable mathematical formula, and/or algorithms stored within its memory device(s) 126 that correlate the received sensor data to the current ground speed of the agricultural sprayer 10.

Moreover, at (216), the control logic 200 includes comparing the current ground speed of the agricultural sprayer to the determined maximum ground speed. For example, in several embodiments, the computing system 120 may compare the current ground speed of the sprayer 10 (e.g., as determined at (214)) to the maximum ground speed for the turn being made or to be made (e.g., as determined at (208)). When the current ground speed of the sprayer 10 is less than or equal to the maximum ground speed for the turn, there is no need to make a ground speed adjustment to the sprayer 10. In such instances, the control logic 200 returns to (206) and awaits another turning radius/angle input.

Conversely, when the current ground speed of the sprayer is greater than the maximum ground speed for the turn, the control logic 200 includes, at (218) adjusting the current ground speed of the agricultural sprayer 10. More specifically, in such instances, the computing system 120 may control the operation of the engine 114, the transmission 116, and/or the braking actuator(s) 118 to reduce the current ground speed of the agricultural sprayer 10 until the current ground speed is at or below the determined maximum ground speed (e.g., as determined at (208)). Thereafter, the control logic 200 returns to (206) and awaits another turning radius/angle input.

The control logic 200 is described above in the context of making any necessary adjustments to the current ground speed of the sprayer 10 based on the determined maximum ground speed when the sprayer 10 is making the turn. However, in alternative embodiments (such as those in which the turning angle sensor 106 is a GPS receiver or other location sensor), any necessary adjustments to the current ground speed of the sprayer 10 may be made before the sprayer 10 begins to turn. In such instances, the ground speed of the sprayer 10 is at or below the maximum ground speed when the sprayer 10 begins to turn.

Additionally, during the turn, the computing system 120 may be configured to independently control the duty cycles of the nozzles 38 to ensure that the target application rate is met. For example, as indicated above, when the sprayer 10 travels at the determined maximum ground speed, the outermost nozzle 38 of the sprayer 10 relative to the direction of the turn (e.g., the nozzle 38A in FIG. 5) may deposit agricultural fluid onto the underlying crops/field surface at the target application rate when operating at a one hundred percent duty cycle. However, when the sprayer 10 is traveling at less than the determined maximum ground speed, the outermost nozzle 38 can meet the target application rate with a shorter duty cycle. Moreover, as the nozzles 38 get closer to the inside of the turn, the nozzles 38 can meet the target application rate with increasingly shorter duty cycles. As such, during a turn, the computing system 120 may be configured to independently control the operation of each nozzle actuator 112 based on current ground speed of the sprayer 10 and the position of its corresponding nozzle 38 on the boom assembly 24 to ensure that all of the nozzles 38 dispense the agricultural fluid at the target application rate without overapplying the agricultural fluid near the inside of the turn.

Figure 6:
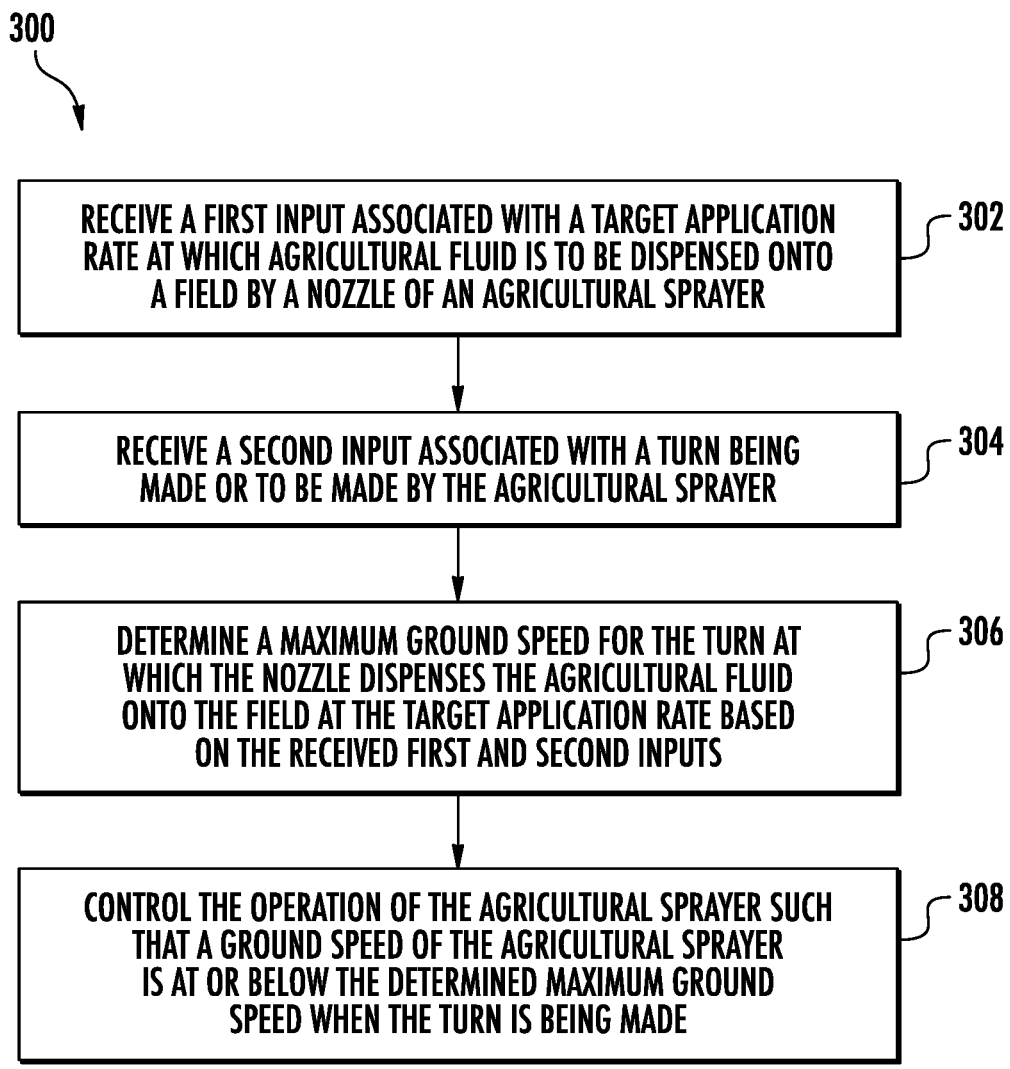
FIG. 6 illustrates a flow diagram of one embodiment of a method for controlling the ground speed of an agricultural sprayer in accordance with aspects of the present subject matter.

Referring now to FIG. 6, a flow diagram of one embodiment of a method 300 for controlling a ground speed of an agricultural sprayer is illustrated in accordance with aspects of the present subject matter. In general, the method 300 will be described herein with reference to the agricultural sprayer 10 and the system 100 described above with reference to FIGS. 1-5. However, it should be appreciated by those of ordinary skill in the art that the disclosed method 300 may generally be implemented with any agricultural sprayer having any suitable sprayer configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include receiving, with a computing system, a first input associated with a target application rate at which agricultural fluid is to be dispensed onto field by a nozzle of an agricultural sprayer. For instance, as described above, the computing system 120 may receive an operator input from the user interface 110 via the communicative link 122. Such input may, in turn, be associated with a target application rate at which agricultural fluid is to be dispensed onto field by the nozzles 38 of the sprayer 10.

Additionally, at (304), the method 300 may include receiving, with the computing system, a second input associated with a turn being made or to be made by the agricultural sprayer. For instance, as described above, the computing system 120 may receive data from the turning position sensor 106 that is associated with the radius or angle of a turn being made or to be made by the agricultural sprayer 10.

Moreover, as shown in FIG. 5, at (306), the method 300 may include determining, with the computing system, a maximum ground speed for the turn at which the nozzle dispenses the agricultural fluid onto the field at the target application rate based on the received first and second inputs. For instance, as described above, the computing system 120 may determine the maximum ground speed for the turn at which a selected nozzle 38 (e.g., the outermost nozzle 38 relative to the direction of the turn) dispenses the agricultural fluid onto the field at the target application rate based on the received first and second inputs.

Furthermore, at (308), the method 300 may include controlling, with the computing system, the operation of the agricultural sprayer such that the ground speed of the agricultural sprayer is at or below the determined maximum ground speed when the turn is being made. For instance, as described above, the computing system 120 may control the operation of the engine 114, the transmission 116, and/or the braking actuator(s) 118 of the sprayer 10 such that the ground speed of the agricultural sprayer 10 is at or below the determined maximum ground speed when the turn is being made.

It is to be understood that the steps of the control logic 200 and the method 300 are performed by the computing system 120 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 120 described herein, such as the control logic 200 and the method 300, is implemented in software code or instructions which are tangibly stored on a tangible computer readable medium. The computing system 120 loads the software code or instructions via a direct interface with the computer readable medium or via a wired and/or wireless network. Upon loading and executing such software code or instructions by the computing system 120, the computing system 120 may perform any of the functionality of the computing system 120 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:
   a frame;
   a tank supported on the frame, the tank configured to store an agricultural fluid;
   a boom assembly coupled to the frame;
   a plurality of nozzles supported on the boom assembly, the plurality of nozzles configured to dispense the agricultural fluid stored within the tank onto an underlying field; and
   a computing system configured to:
      receive a first input associated with a target application rate at which the agricultural fluid is to be dispensed onto the field;
      receive a second input associated with a turn being made or to be made by the agricultural sprayer;
      determine a maximum ground speed for the turn at which a selected nozzle of the plurality of nozzles dispenses the agricultural fluid onto the field at the target application rate based on the received first and second inputs; and
      control an operation of the agricultural sprayer such that the ground speed of the agricultural sprayer is at or below the determined maximum ground speed when the turn is being made.

2. The agricultural sprayer of claim 1, wherein the selected nozzle corresponds to a nozzle of the plurality of nozzles positioned nearest to an end of the boom assembly located on an outside of the turn.

3. The agricultural sprayer of claim 1, wherein, when the turn is being made, the computing system is further configured to independently control a duty cycle of each nozzle of the plurality of nozzles based on the ground speed of the agricultural sprayer such that each nozzle dispenses the agricultural fluid onto the field at the target application rate.

4. The agricultural sprayer of claim 1, wherein the computing system is further configured to:
   receive a third input associated with a flow rate of the agricultural fluid through the plurality of nozzles; and
   determine the maximum ground speed based on the received first, second, and third inputs.

5. The agricultural sprayer of claim 4, wherein the received third input is indicative of at least one of a pressure of the agricultural fluid being supplied to the nozzle, a flow rate of the agricultural fluid being supplied to the nozzle, or an orifice size of the nozzle.

6. The agricultural sprayer of claim 1, further comprising:
   a steering position sensor communicatively coupled to the computing system, the steering position sensor configured to capture data indicative of a radius of the turn being made by the agricultural sprayer,
   wherein computing system is configured to receive the first input from the steering position sensor.

7. The agricultural sprayer of claim 1, wherein computing system is configured to receive the first input from a location sensor and a stored guidance map.

8. A system for controlling a ground speed of an agricultural sprayer, the system comprising:
- a boom assembly;
- a nozzle supported on the boom assembly, the nozzle configured to dispense an agricultural fluid onto a field across which the agricultural sprayer is traveling; and
- a computing system configured to:
  - receive a first input associated with a target application rate at which the agricultural fluid is to be dispensed onto the field;
  - receive a second input associated with a turn being made or to be made by the agricultural sprayer;
  - determine a maximum ground speed for the turn at which the nozzle dispenses the agricultural fluid onto the field at the target application rate based on the received first and second inputs; and
  - control an operation of the agricultural sprayer such that the ground speed of the agricultural sprayer is at or below the determined maximum ground speed when the turn is being made.

9. The system of claim 8, wherein the computing system is further configured to:
- receive a third input associated with a flow rate of the agricultural fluid through the nozzle; and
- determine the maximum ground speed based on the received first, second, and third inputs.

10. The system of claim 9, wherein the received third input is indicative of at least one of a pressure of the agricultural fluid being supplied to the nozzle, a flow rate of the agricultural fluid being supplied to the nozzle, or an orifice size of the nozzle.

11. The system of claim 9, wherein, when determining the maximum ground speed, the computing system is configured to determine the maximum ground speed based on a position of the nozzle on the boom assembly and the received first, second, and third inputs.

12. The system of claim 8, further comprising:
- a steering position sensor communicatively coupled to the computing system, the steering position sensor configured to capture data indicative of a radius of the turn being made by the agricultural sprayer,
- wherein computing system is configured to receive the first input from the steering position sensor.

13. The system of claim 12, wherein the computing system is configured to determine the maximum ground speed when the turn is being made.

14. The system of claim 8, wherein computing system is configured to receive the first input from a location sensor and a stored guidance map.

15. The system of claim 14, wherein the computing system is configured to determine the maximum ground speed before the turn is made.

16. A method for controlling a ground speed of an agricultural sprayer, the agricultural sprayer including a nozzle configured to dispense an agricultural fluid onto a field across which the agricultural sprayer is traveling, the method comprising:
- receiving, with a computing system, a first input associated with a target application rate at which the agricultural fluid is to be dispensed onto the field;
- receiving, with the computing system, a second input associated with a turn being made or to be made by the agricultural sprayer;
- determining, with the computing system, a maximum ground speed for the turn at which the nozzle dispenses the agricultural fluid onto the field at the target application rate based on the received first and second inputs; and
- controlling, with the computing system, an operation of the agricultural sprayer such that the ground speed of the agricultural sprayer is at or below the determined maximum ground speed when the turn is being made.

17. The method of claim 16, further comprising:
- receiving, with the computing system, a third input associated with a flow rate of the agricultural fluid through the nozzle,
- wherein determining the maximum ground speed comprises determining, with the computing system, the maximum ground speed based on the received first, second, and third inputs.

18. The method of claim 17, wherein determining the maximum ground speed comprises determining, with the computing system, the maximum ground speed based on a position of the nozzle on the boom assembly and the received first, second, and third inputs.

19. The method of claim 16, wherein receiving the first input comprises receiving, with the computing system, steering position sensor data indicative of a radius of the turn being made by the agricultural sprayer.

20. The method of claim 16, wherein receiving the first input comprises receiving, with the computing system, data from a location sensor and a stored guidance map.

* * * * *